T. H. BOLTE.
WAGON REACH COUPLING.
APPLICATION FILED JAN. 29, 1921.
1,404,264.  Patented Jan. 24, 1922.
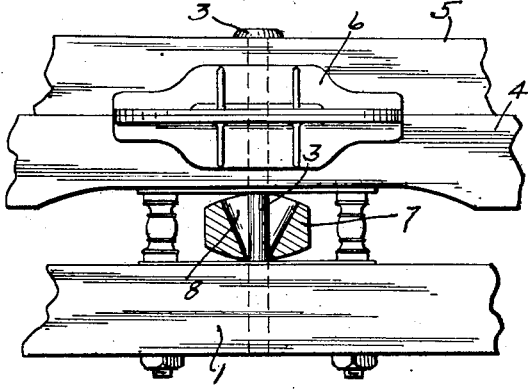
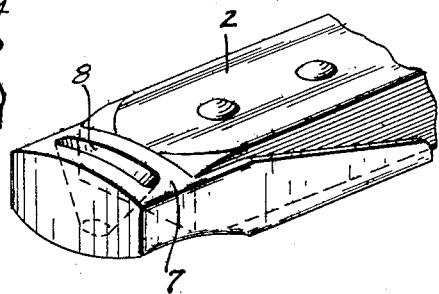
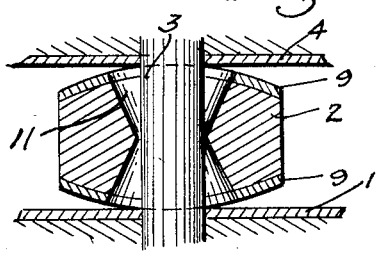
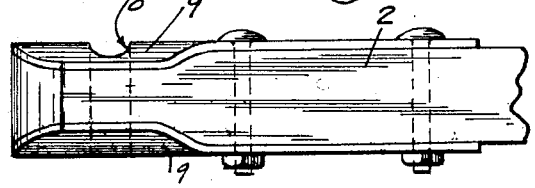
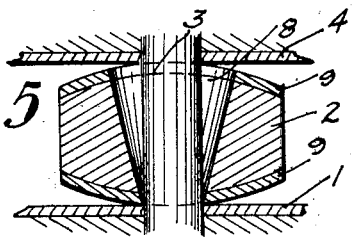
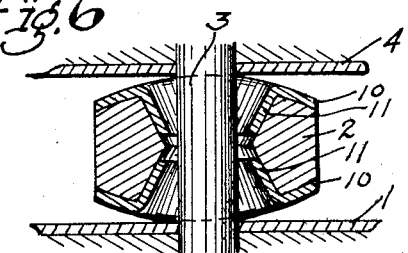
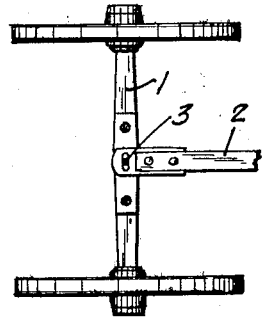
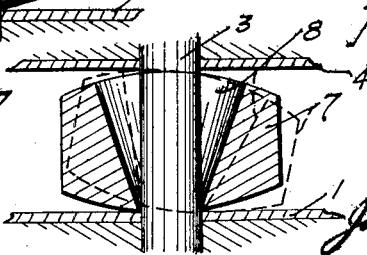
INVENTOR
T. H. Bolte
BY HIS ATTORNEY
James T. Williamson

UNITED STATES PATENT OFFICE.

THEODORE H. BOLTE, OF KEARNEY, NEBRASKA, ASSIGNOR OF ONE-HALF TO E. F. BOLTE, OF CHICAGO, ILLINOIS.

WAGON-REACH COUPLING.

1,404,264.        Specification of Letters Patent.      Patented Jan. 24, 1922.

Application filed January 29, 1921. Serial No. 441,066.

*To all whom it may concern:*

Be it known that I, THEODORE H. BOLTE, a citizen of the United States, residing at Kearney, in the county of Buffalo and State of Nebraska, have invented certain new and useful Improvements in Wagon-Reach Couplings; and I do hereby declare the following to be a full, clear, and exact description of the invention, such as will enable others skilled in the art to which it appertains to make and use the same.

This invention relates to a wagon reach coupling and is designed to eliminate the strain on the wagon reach and adjacent parts at the coupling to the front axle when the front or rear axles are tipped by one of the wheels dropping into a depression or passing over an obstruction. The wagon reach is coupled to the front axle by a pin and is held between the said axle and a member extending across and above the same, commonly known as a "sand board." The reach is customarily rigidly connected to the rear axle, so that if one of the rear wheels is depressed or elevated or the axle transversely inclined, for any reason, a twisting strain is placed upon the wagon reach at its coupling to the front axle. This strain is transmitted to the king bolt, which usually passes through the axle and sand board and the bolster supported on the latter and the said strain often results in breakage of the reach or other parts.

It is an object of this invention, therefore, to provide a wagon reach coupling capable of considerable extent of angular movement of the reach to either side without placing strain upon the reach or its adjacent part.

It is a further object of the invention to provide such a wagon reach coupling without increasing the number of parts ordinarily employed in the wagon construction.

These and other objects and advantages of the invention will be apparent from the following description made in connection with the accompanying drawings in which like reference characters refer to the same parts throughout the different views and in which Fig. 1 is a view in elevation of parts of the front axle of a wagon, the sand board and bolster, showing the wagon reach in section;

Fig. 2 is a plan view of the axle of a wagon showing the wheels thereon and the connection of the wagon reach thereto;

Fig. 3 is a perspective view of one end of the reach showing one form of coupling applied thereto;

Figs. 4 to 7, inclusive, are sections taken through the reach at the coupling thereof with the king bolt, showing different forms of applicant's novel coupling; and Fig. 8 is a view in side elevation of the end of the reach shown in Figs. 4 to 6.

Referring to the drawings, in Fig. 2 is shown the front wheels of an ordinary work wagon connected by the axle member 1. The wagon reach 2 is connected to the axle by a king bolt 3, which passes through an opening in the end of the reach and through a hole in the axle. In Fig. 1, the axle 1 is shown somewhat enlarged and the sand board 4 is shown as supported thereabove, the bolster 5 being superposed on the sand board 4 for swiveling movement thereon by means of the well known fifth wheel construction 6. The king bolt 3 passes through the members 4, 5 and 6 and into the axle member 1. The wagon reach 2 extends between members 1 and 4 and, in accordance with this invention, is provided with an opening, the dimension of which, in a direction longitudinally of the reach, is just slightly larger than the diameter of the king bolt, but the dimension of which, transversely of the reach, is at one portion slightly larger than the diameter of the king bolt, but which opening flares from this portion and has a much greater dimension at its other end. The opening through the reach is thus flaring or conical in transverse section.

As shown in Fig. 3, the reach may be provided with an end casting which extends along the sides and lower surface of the same and forms a head portion 7 at the end of the reach. The flaring or conical hole 8 is formed through this head portion and adapted to receive the king bolt.

In Fig. 4, the wagon reach 2 is shown as provided with iron plates 9 at either side thereof and the opening through which the king bolt passes is formed with its smallest dimension intermediate the top and bottom of the reach and flares from this point toward the top and bottom.

In Fig. 5, the reach is shown as provided with metal plates 9 at the top and bottom thereof and the conical opening therein is shown as having its smallest dimension at the bottom portion of the reach and flares to its greatest portion at the upper side thereof.

In Fig. 6, the reach 2 is shown as provided with metal plates 10 on its upper and lower surfaces and these plates are provided with swaged or flanged portions 11 which extend into the opening formed through the reach, which opening is shown as formed with its smallest dimension intermediate the top and bottom surfaces of the reach and flaring to its greatest dimension at each top and bottom surface. The plates 9 and 10, secured to the top and bottom surfaces of the reach, are extended some distance from the front end thereof, as shown in Fig. 8, and are secured in place by spaced nutted bolts passing through the same and the body of the reach. It will be noted that, in all of the forms shown, the front end of the reach, which is disposed between members 1 and 4, is formed with curved top and bottom portions, so that the reach can readily rock from side to side between the members 1 and 4. The opening through the reach is designed to permit at least 30 degrees of turning movement to each side, which will ordinarily be sufficient to accommodate the tilt of the axles occurring in a work wagon. The movement of the reach on the king bolt is indicated by dotted lines in Fig. 7, it being understood, of course, that the movement of the reach can continue until one side of the conical opening comes in contact with the side of the king bolt.

It is thought, from the above description, that the operation of the device will be clear. When one or the other of the axles is tilted, no strain will be placed on the reach, due to this tilting action. If the front axle is tilted, the king bolt will move in the opening 8. If the rear axle is tilted, the wagon reach will rock between members 1 and 4 and no strain will be placed thereon or on the king bolt. No strain will likewise be placed on these parts, if the front axle tilts in one direction and the rear axle tilts in the other direction.

The applicant is aware that the construction of wagon reaches have been made to permit the tilting movement described, but such constructions have usually been more or less complicated and added to the cost of the wagon and to the parts thereof. From the above description, it is seen that applicant has provided a wagon reach coupling of extreme simplicity, yet one which is highly efficient and of ample strength to insure the proper functioning of the same without danger of breakage.

It will, of course, be understood that various changes may be made in the form and proportions of the parts without departing from the scope of applicant's invention, which, generally stated, consists in the matter shown and described and set forth in the appended claims.

What is claimed is:—

1. The combination with the axle and sand board of a wagon and a king bolt extending therethrough, of a wagon reach having an opening formed therein of flaring shape adapted to receive the king bolt.

2. The combination with the axle and sand board of a wagon and king bolt extending therethrough, of a reach member disposed between the sand board and axle and adapted to receive the king bolt and provided with an opening therethrough of slightly greater width than the king bolt in a direction longitudinally of the reach and having one dimension in a direction transversely of the reach slightly greater than the diameter of the king bolt, said opening flaring or diverging from this dimension.

3. A wagon reach member formed at its end with oppositely disposed curved surfaces and having a flaring opening therethrough adapted to receive a king bolt.

4. A wagon reach formed at one end with oppositely disposed curved surfaces having an opening therethrough adapted to receive a king bolt to couple said reach to the front axle, said opening being of flattened frusto-conical shape in a direction transversely of the reach.

5. A wagon reach member adapted to be disposed between the front axle and sand board of a wagon and to be secured thereto by a king bolt, having an opening therethrough adapted to receive the king bolt, said opening having a dimension at one point taken transversely of the reach of slightly greater diameter than the king bolt, the sides of the opening diverging outwardly from this point.

6. A wagon reach adapted to be disposed between the front axle and sand board of a wagon and to be connected thereto by a king bolt having a metal member secured to one end thereof and having a head portion thereon at one end of said reach and having an opening therethrough of flattened frusto-conical shape adapted to receive the king bolt.

7. A wagon structure having in combination an axle, a sand board above the same and spaced therefrom, a king bolt passing vertically through said axle and sand board and a reach member disposed between said axle and sand board having a flaring opening therein through which the king bolt passes, whereby rotating movements of the reach about its longitudinal axis are permitted.

In testimony whereof I affix my signature in presence of two witnesses.

THEODORE H. BOLTE.

Witnesses:
 H. T. TROUPE,
 IDA M. BALL.